(12) United States Patent  (10) Patent No.: US 11,407,244 B2
Miyasa et al.  (45) Date of Patent: Aug. 9, 2022

(54) INK JET RECORDING METHOD

(71) Applicant: Seiko Epson Corporation, Tokyo (JP)

(72) Inventors: Ryota Miyasa, Matsumoto (JP); Hideki Okada, Shiojiri (JP)

(73) Assignee: Seiko Epson Corporation ( * ) Notice: Subject to any disclaimer, the term of this patent is extended or adjusted under 35 U.S.C. 154(b) by 96 days.

(21) Appl. No.: 17/083,481

(22) Filed: Oct. 29, 2020

(65) Prior Publication Data
US 2021/0129568 A1 May 6, 2021

(30) Foreign Application Priority Data
Oct. 30, 2019 (JP) .............................. JP2019-197242

(51) Int. Cl.
B41M 5/00 (2006.01)
C09D 11/322 (2014.01)
B41J 3/407 (2006.01)
C09D 11/037 (2014.01)
B41J 2/21 (2006.01)
C09D 11/106 (2014.01)

(52) U.S. Cl.
CPC .......... B41M 5/0023 (2013.01); B41J 2/2114 (2013.01); B41J 3/4078 (2013.01); C09D 11/037 (2013.01); C09D 11/106 (2013.01); C09D 11/322 (2013.01)

(58) Field of Classification Search
CPC .. B41J 3/4078; B41J 2/04581; B41J 2/04595; B41J 2/2114; B41J 2/2117; B41J 2/04588; C09D 11/037; C09D 11/40; C09D 11/54; C09D 11/106; C09D 11/322; D06P 1/445; D06P 5/30; B41M 5/0023
See application file for complete search history.

(56) References Cited

U.S. PATENT DOCUMENTS 10,472,530 B2* 11/2019 Kasperchik ........... C09C 1/3661
11,111,404 B2* 9/2021 Okuda .................... B41J 2/2114
2007/0060670 A1* 3/2007 Ellis .......................... D06P 5/30
 523/160
2013/0253106 A1 9/2013 Saito et al.
2014/0292902 A1* 10/2014 Kagata .................. C09D 11/40
 347/100

FOREIGN PATENT DOCUMENTS

CN 106457823 A 2/2017
EP 3127705 A1 2/2017
JP 2013-194222 A 9/2013

* cited by examiner

Primary Examiner — An H Do
(74) Attorney, Agent, or Firm — Harness, Dickey & Pierce, P.L.C.

(57) ABSTRACT

An ink jet recording method according to the present disclosure is a method for recording on a textile including ejecting a white ink composition for ink jet textile printing containing a white pigment and water with an ink jet recording apparatus, wherein the white ink composition is ejected as 9 ng or less of droplets from a nozzle, and the droplets are ejected and recorded on the textile such that a droplet ejected later has a higher flight speed than a droplet ejected earlier and the droplets coalesce before landing on the textile.

7 Claims, 3 Drawing Sheets

INK JET RECORDING METHOD

The present application is based on, and claims priority from JP Application Serial Number 2019-197242, filed Oct. 30, 2019, the disclosure of which is hereby incorporated by reference herein in its entirety.

BACKGROUND

1. Technical Field

The present disclosure relates to an ink jet recording method.

2. Related Art

Images based on image data signals are recorded by various methods on recording media, such as paper sheets. In particular, an ink jet method can efficiently utilize an ink composition at low running costs because the ink composition is applied only to a required image area with inexpensive equipment to directly form an image on a recording medium. Furthermore, the ink jet method makes low noise and is therefore a good recording method.

An ink jet recording method has been studied on application in textile dyeing. For example, a direct to garment (DTG) printer, which enables direct printing on fabrics, has been developed. For printing on ink jet paper sheets, dots are being decreased in size to form an image with higher resolution. On the other hand, for printing on textiles, it is difficult to form an image with high resolution due to various surface profiles and conditions of the textiles. For textile printing, however, good color development, high fastness, and high printing speed are more important than high-resolution image printing. Thus, many DTG printers employ large-dot printing to satisfy both good color development and high printing speed. In DTG printers, a large amount of white ink is sometimes applied to cover textiles (see JP-A-2013-194222, for example).

However, application of a large amount of white ink in a short time tends to generate a mist. Consequently, a mist of white ink adheres to the periphery of a recording head and may cause contamination in the apparatus.

SUMMARY

An ink jet recording method according to an aspect of the present disclosure is a method for recording on a textile including ejecting a white ink composition for ink jet textile printing containing a white pigment and water with an ink jet recording apparatus, wherein the white ink composition is ejected as 9 ng or less of droplets from a nozzle, and the droplets are ejected and recorded on the textile such that a droplet ejected later has a higher flight speed than a droplet ejected earlier and the droplets coalesce before landing on the textile.

In an aspect of the ink jet recording method, the textile may be treated with a pretreatment agent containing at least one coagulant selected from polyvalent metal salts, cationic polymers, and cationic surfactants.

In an aspect of the ink jet recording method, the white ink composition may contain 8% or more by mass of a component that reacts with the pretreatment agent.

In an aspect of the ink jet recording method, the component that reacts with the pretreatment agent may be composed of resin particles.

In an aspect of the ink jet recording method, the ink jet recording apparatus may include a nozzle array configured to eject the white ink composition located upstream in a sub-scanning direction, and a nozzle array configured to eject a non-white ink composition for ink jet textile printing containing a non-white pigment and water located downstream in the sub-scanning direction.

In an aspect of the ink jet recording method, the white ink composition may have a density of 1.12 g/cm$^3$ or more.

In an aspect of the ink jet recording method, the white pigment may be composed of titanium oxide particles.

DESCRIPTION OF EXEMPLARY EMBODIMENTS

Embodiments of the present disclosure are described below. These embodiments describe examples of the present disclosure. The present disclosure is not limited to these embodiments and includes various modified embodiments without departing from the gist of the present disclosure. It should be noted that all the constituents described below are not necessarily essential for the present disclosure.

The term "ink jet textile printing", as used herein, refers to ink recording (printing) on a textile, which is a type of recording medium, by an ink jet method and is a type of ink jet recording. The term "recorded material", as used herein, refers to a recording medium on which an image is recorded with an ink. The term "printed material", as used herein, is included in the recorded material and refers to a textile, a type of recording medium, on which an image is recorded with an ink. The term "non-white", as used herein, refers to a color other than white.

1. Ink Jet Recording Method

An ink jet recording method according to an embodiment of the present disclosure is a method for ejecting a white ink composition for ink jet textile printing containing a white pigment and water (hereinafter also referred to simply as a "white ink composition") for recording on a textile with an ink jet recording apparatus, wherein the white ink composition is ejected as 9 ng or less of droplets from a nozzle, and the droplets are ejected and recorded on the textile such that a droplet ejected later has a higher flight speed than a droplet ejected earlier and the droplets coalesce before landing on the textile. The ink jet recording method according to the present embodiment is described below with reference to the accompanying drawings.

1.1. Ejection Method

Figure 1:
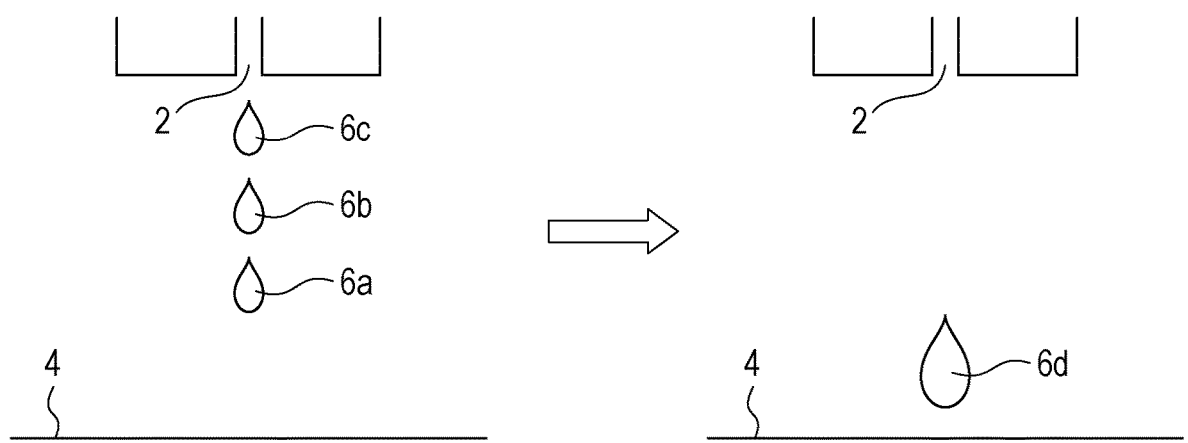
FIG. 1 is a schematic view of ink droplets ejected from a nozzle and approaching a textile.

FIG. 1 illustrates ink droplets ejected from a nozzle and approaching a textile. In the ejection method illustrated in FIG. 1, three ink droplets ejected from a nozzle opening 2 coalesce before landing on a textile 4. In the ejection method illustrated in FIG. 1, an ink droplet 6b ejected second from the nozzle opening 2 has a higher flight speed than an ink droplet 6a ejected first, and an ink droplet 6c ejected third from the nozzle opening 2 has a higher flight speed than the ink droplet 6b ejected second. Thus, the ink droplets 6a, 6b, and 6c ejected from the nozzle opening 2 coalesce into an ink droplet 6d before landing on the textile 4, and the ink droplet 6d lands on the textile 4. In the ink jet recording method according to the present embodiment, while a carriage scans once, a plurality of droplets ejected from a nozzle opening coalesce into a single ink droplet before landing on a textile and form a single pixel.

In the ejection method illustrated in FIG. 1, a satellite droplet of the ink droplet 6a ejected first and a satellite droplet of the ink droplet 6b ejected second coalesce with the ink droplet 6c ejected third. This reduces mist and contamination in the apparatus. The term "satellite droplet", as used herein, refers to a small droplet or dust separated from a main ink droplet ejected from a nozzle.

When the ink droplets 6a, 6b, and 6c coalesce into the ink droplet 6d, the ink droplet 6d has increased kinetic energy, and the inside of the ink droplet 6d is vigorously agitated. When the textile 4 is treated with a pretreatment agent containing a coagulant, such as a polyvalent metal salt, the large coalescent ink droplet 6d landing on the textile 4 facilitates the elution of the coagulant from the textile 4 and promotes an aggregation reaction on the surface of the textile 4. This potentially prevents blurring even if a large number of droplets are deposited in a short time. This can improve printing speed.

The amount of ink droplets of the white ink composition ejected from a nozzle may be 9 ng or less, 1 to 9 ng, or 5 to 9 ng. An amount of ink droplets in these ranges results in an image with high resolution, a high drying speed, and high ejection stability. The amount of ink droplets can be controlled by an ejection mechanism described later.

An ink droplet of the white ink composition ejected from a nozzle may have an ejection velocity of 5.0 m/s or more, 5.0 to 15.0 m/s, or 5.0 to 10.0 m/s. An ejection velocity of an ink droplet in these ranges results in high ejection stability and coalescence of a plurality of ink droplets ejected from a nozzle. The ejection velocity of ink droplets can be controlled by an ejection mechanism described later. As illustrated in FIG. 1, the ejection velocity of an ink droplet can be determined by photographing an ink droplet ejected from the nozzle opening 2 with a camera or a video camera from a side of the nozzle surface, measuring the transit time (s) of the ink droplet passing through a specific distance between the nozzle opening 2 and the textile 4, and calculating the ejection velocity from the measured value. More specifically, the ejection velocity of an ink droplet can be determined by photographing the ink droplet with a high-speed camera from a side of the nozzle surface, measuring the transit time (s) of the ink droplet passing through a distance in the range of 0.5 to 1.0 mm between the nozzle opening and the textile, and calculating an average ejection velocity (Vm) from the measured value.

The distance between the nozzle opening 2 and the textile 4 may range from 0.5 to 10 mm, 1.0 to 9.0 mm, or 2.0 to 8.0 mm. A distance between the nozzle opening 2 and the textile 4 in these ranges results in the prevention of the nozzle surface coming into contact with the textile 4 and the prevention of staining of the textile 4 even if the textile 4 absorbs the white ink composition and swells during the printing process. This can also reduce a deviation from the target landing position of an ink droplet, prevent deterioration in images, facilitate an ink droplet reaching the textile, and reduce mist. The droplets can be easily configured to coalesce before landing on the textile at a distance above the lower limit.

The textile 4 may be, but is not limited to, natural fiber or synthetic fiber, such as silk, cotton, wool, nylon, polyester, or rayon. Among these, the textile 4 may be cotton or a cotton and polyester blend, which can withstand fixing of the white ink composition at high temperatures.

A white image of the white ink composition can be formed on the textile by the ink jet recording method according to the present embodiment. A non-white ink composition can be applied to the white image to print a non-white image on the white image.

The ink jet recording method according to the present embodiment may include a drying process after the white ink composition is applied for recording to the textile with the ink jet recording apparatus. In the drying process, the textile is heat-treated by hot pressing. The heat treatment can fuse a resin that may be contained in the white ink composition on the surface of the textile and evaporate water. This tends to further improve the scratch resistance of the image.

The heat treatment may be, but not limited to, a hot pressing method, an atmospheric steam method, a high-pressure steam method, or a Thermofix method. The heat source may be, but is not limited to, infrared light (lamp). The temperature for the heat treatment may be any temperature at which a resin possibly contained in the white ink composition can be fused and water can be evaporated, for example, 150° C. or more or approximately 150° C. to 200° C. A heat treatment temperature in these ranges tends to result in an image with further improved scratch resistance.

After the heating process, the textile may be washed with water and may be dried. If necessary, an unfixed pigment may be washed off by soaping, that is, with a hot soap solution.

1.2. Ejection Mechanism

In the ink jet recording apparatus, in synchronization with the movement of a head in the main scanning direction, ink droplets are ejected from a nozzle opening of the head to record an image on the textile. Ink droplets are ejected, for example, by expanding and contracting a pressure chamber in communication with the nozzle opening.

The pressure chamber is expanded and contracted, for example, by utilizing the deformation of a piezoelectric device. In such a head, a piezoelectric device deforms in response to a drive pulse sent to the head and changes the volume of a pressure chamber. The volume change causes a change in pressure on the white ink composition in the pressure chamber and causes ink droplets to be ejected from a nozzle opening.

In such an ink jet recording apparatus, a plurality of drive pulses are successively coupled to form a drive signal. Print data including gray scale information are sent to the head. Based on the print data, only necessary drive pulses are selected from the drive signal and are sent to the piezoelectric device. Thus, the amount of ink droplets to be ejected from a nozzle opening is changed according to the gray scale information.

More specifically, for example, in an ink jet recording apparatus with four gray scale composed of unrecorded print data, small dot print data, medium dot print data, and large dot print data, different amounts of ink droplets are ejected according to the gray scale.

Figure 2:
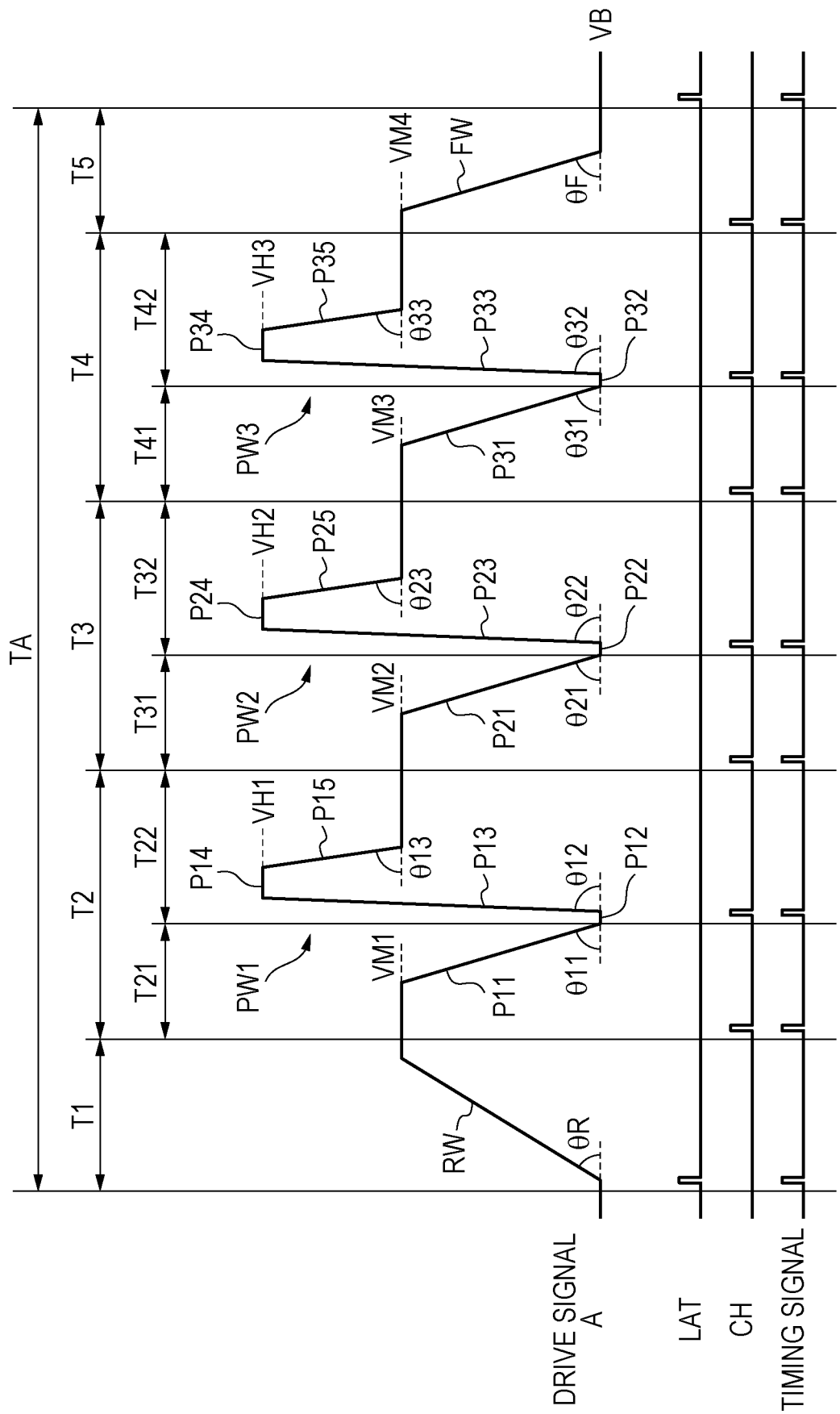
FIG. 2 is a waveform of a drive signal for driving a head.

A drive signal, for example, illustrated in FIG. 2 can be used for recording with such a gray scale. As illustrated in FIG. 2, a drive signal A is a pulse train waveform signal repeatedly generated in recording cycles TAs and includes a potential rise waveform RW in a period T1, a first pulse waveform PW1 in a period T2, a second pulse waveform PW2 in a period T3, a third pulse waveform PW3 in a period T4, and a potential fall waveform FW in a period T5 successively coupled.

In the potential rise waveform RW, the electric potential increases linearly from a base potential VB to a first drive potential VM1 at a gradient θR. The base potential VB is the ground potential. The pulse waveforms PW1, PW2, and PW3 include discharging elements P11, P21, and P31, in which the electric potential decreases from drive potentials VM1, VM2, and VM3 to the base potential VB at gradients θ11, θ21, and θ31, respectively, charging elements P13, P23, and P33, in which the electric potential increases in a short time from the base potential VB to the highest electric potentials VH1, VH2, and VH3 at steep gradients θ12, θ22, and θ32, respectively, hold elements P14, P24, and P34, in which the highest electric potentials are maintained, and discharging elements P15, P25, and P35, in which the electric potential decreases from the highest electric potentials VH1, VH2, and VH3 to electric potentials VM2, VM3, and VM4 at gradients θ13, θ23, and θ33, respectively.

These pulse waveforms PW1, PW2, and PW3 are independent signals by which ink droplets can be ejected. When each pulse waveform is sent to the piezoelectric device, ink droplets that can form a small dot are ejected from a nozzle opening.

The intermediate electric potentials VMs in FIG. 2 are referred to as bias voltages. The electric potential of the piezoelectric device is maintained at one of the lowest electric potentials VLs, the highest electric potentials VHs, and the intermediate electric potentials VMs. Such an intermediate state at the beginning of driving enables a volume change for expansion or contraction.

The potential difference of the charging elements P13, P23, and P33 can be controlled to adjust the amount of ink per ink droplet. One recording cycle corresponds to the resolution of recording, and one pixel is recorded in one recording cycle.

The gradients θ12, θ22, and θ32 of the charging elements P13, P23, and P33 in the pulse waveforms PW1, PW2, and PW3 can be changed to adjust the flight speed of ink droplets. For example, in the ejection method illustrated in FIG. 1, the gradients of θ12<θ22<θ32 can result in the flight speed in the order of the ink droplet 6a ejected first<the ink droplet 6b ejected second<the ink droplet 6c ejected third from the nozzle. Thus, the ink droplets 6a, 6b, and 6c ejected from the nozzle are formed by a drive signal generated by coupling the pulse waveforms PW1, PW2, and PW3 and can coalesce before landing on the textile 4 when the gradient θ22 from the base potential to the highest electric potential in the pulse waveform PW2 is larger than the gradient θ12 from the base potential to the highest electric potential in the pulse waveform PW1 and when the gradient θ32 from the base potential to the highest electric potential in the pulse waveform PW3 is larger than the gradient θ22 from the base potential to the highest electric potential in the pulse waveform PW2.

The time required to eject one ink droplet may range from 10 to 70 μs, 15 to 50 μs, or 20 to 40 μs. In these ranges, droplets can be easily configured to coalesce before landing on the textile.

The travel speed of the head in the main scanning direction may range from 100 to 500 cps, 200 to 400 cps, or 300 to 350 cps. In these ranges, droplets can be easily configured to coalesce before landing on the textile.

1.3. Ink Jet Recording Apparatus

Figure 3:
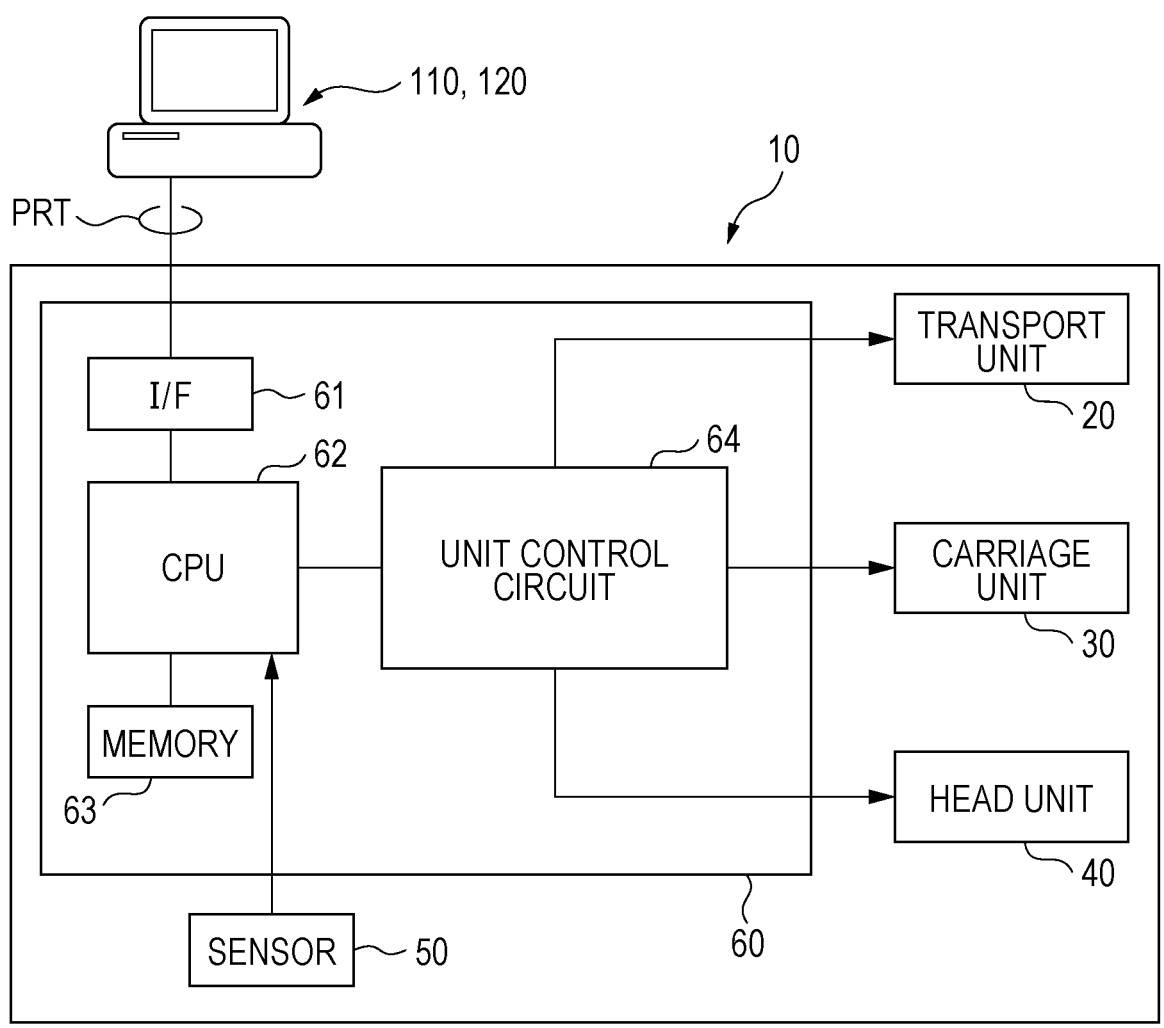
FIG. 3 is a block diagram of an ink jet recording apparatus.

FIG. 3 is a block diagram of an ink jet recording apparatus for recording by the ink jet recording method according to the present embodiment. An ink jet recording apparatus 10 includes a transport unit 20, a carriage unit 30, a head unit 40, a sensor group 50, and a controller 60. The ink jet recording apparatus 10 receives a printing signal PRT from a computer 110 equipped with a display 120, and the controller 60 controls each unit for recording on a recording medium. The controller 60 includes a unit control circuit 64, a CPU 62, a memory 63, and an interface 61. The head unit 40 includes the head described above and an ejection mechanism. The ejection velocity, ejection frequency, and the amount of ink for recording are determined by the head unit 40 controlled by the controller 60. The carriage unit 30 moves the head in the main scanning direction. The transport unit 20 transports a recording medium in the sub-scanning direction.

The ink jet recording apparatus 10 may include a nozzle array for ejecting a white ink composition located upstream in the sub-scanning direction and a nozzle array for ejecting a non-white ink composition located downstream in the sub-scanning direction. These nozzle arrays may be subarrays of a nozzle array or may be individual nozzle arrays. Known ink jet recording apparatuses include a nozzle array for ejecting a white ink composition and a nozzle array for ejecting a non-white ink composition in parallel in the main scanning direction. An underlayer is first formed by using the white ink composition nozzle alone, and after the recording medium is transported back the non-white ink composition is applied for recording. Thus, it takes a long time. In the ink jet recording apparatus 10 including the nozzle array for ejecting a white ink composition located upstream in the sub-scanning direction and the nozzle array for ejecting a non-white ink composition located downstream in the sub-scanning direction, however, the white ink composition and the non-white ink composition can be successively ejected and rapidly form an image.

In general, such a high-speed system configuration may cause bleeding of an ink composition. In the ink jet recording method according to the present embodiment, however, ink droplets coalesce before landing on the textile and have increased kinetic energy, and the inside of the coalescent ink droplet is vigorously agitated. Thus, the coalescent ink droplet landing on the textile easily promotes an aggregation reaction on the surface of the textile and increases the fixing speed (pinning speed) of the ink composition. This potentially prevents blurring even if a large number of droplets are deposited in a short time. In particular, the aggregation reaction tends to be promoted on a textile treated with a pretreatment agent described later. Thus, even when a white ink composition and a non-white ink composition are successively ejected and rapidly form an image, the ink jet recording method according to the present embodiment rarely causes blurring and can be used in such an ink jet recording apparatus.

1.4. Textile Pretreatment Process

To prevent ink bleeding on a textile, a pretreatment process of pretreating the textile with a pretreatment agent may be performed before a white ink composition is applied to the textile to form an image. In the pretreatment process, a pretreatment agent containing a coagulant is applied to a textile. More specifically, a pretreatment agent is applied to a textile, and the textile is then dried.

A method of applying a pretreatment agent to a textile may be, but is not limited to, a method of dipping the textile in the pretreatment agent (dip application), a method of applying the pretreatment agent with a roll coater (roller application), a method of spraying the pretreatment agent with a spray unit (spray application), or a method of ejecting the pretreatment agent by an ink jet method (ink jet application). A pretreatment agent can be more uniformly applied to a textile by the ink jet application.

The coagulant can aggregate a white pigment in a white ink composition, precipitate a component that reacts with the coagulant (for example, resin particles described later), and form an ink film on a textile. This can improve the scratch resistance of an image and prevent ink bleeding on the textile. The amount of the component that reacts with the coagulant may be 8% or more by mass or 8% to 13% by mass of the total mass of the white ink composition.

The coagulant may be at least one selected from polyvalent metal salts, cationic polymers, and cationic surfactants.

Examples of polyvalent metal compounds include, but are not limited to, titanium compounds, chromium compounds, copper compounds, cobalt compounds, strontium compounds, barium compounds, iron compounds, aluminum compounds, calcium compounds, magnesium compounds, and salts thereof (polyvalent metal salts). Among these polyvalent metal compounds, at least one selected from aluminum compounds, calcium compounds, and magnesium compounds, or at least one selected from calcium compounds and magnesium compounds, or particularly calcium compounds can effectively aggregate a white pigment.

Specific examples of the polyvalent metal compounds include inorganic pigments, such as calcium carbonates, such as heavy calcium carbonate and light calcium carbonate, chalk, kaolin, fired clay, talc, calcium nitrate, calcium sulfate, barium sulfate, titanium dioxide, zinc oxide, zinc sulfide, zinc carbonate, aluminum silicate, calcium silicate, magnesium silicate, synthetic silica, aluminum hydroxide, alumina, sericite, white carbon, saponite, calcium montmorillonite, sodium montmorillonite, and bentonite, and organic pigments, such as acrylic plastic pigments, polyethylene, and urea polymers. Among these, at least one selected from calcium nitrate and calcium chloride, particularly calcium nitrate, can have sufficient solubility in water and leave a smaller amount of residue.

Examples of the cationic polymers include cationic urethane resins, cationic olefin resins, and cationic allylamine resins.

The cationic urethane resins can be appropriately selected from known cationic urethane resins. The cationic urethane resins may be commercial products, for example, Hydran CP-7010, CP-7020, CP-7030, CP-7040, CP-7050, CP-7060, and CP-7610 (trade names, manufactured by DIC Corporation), Superflex 600, 610, 620, 630, 640, and 650 (trade names, manufactured by Dai-ichi Kogyo Seiyaku Co., Ltd.), and urethane emulsions WBR-2120C and WBR-2122C (trade names, manufactured by Taisei Fine Chemical Co., Ltd.).

The cationic olefin resins have a skeleton of olefin, such as ethylene and/or propylene, and can be appropriately selected from known cationic olefin resins. The cationic olefin resins may be dispersed in a solvent containing water and/or an organic solvent and may form emulsions. The cationic olefin resins may be commercial products, for example, Arrowbase CB-1200 and CD-1200 (trade names, manufactured by Unitika Ltd.).

The cationic allylamine resins may be appropriately selected from known cationic allylamine resins, for example, polyallylamine hydrochloride, polyallylamine-amide sulfate, allylamine hydrochloride-diallylamine hydrochloride copolymers, allylamine acetate-diallylamine acetate copolymers, allylamine hydrochloride-dimethylallylamine hydrochloride copolymers, allylamine-dimethylallylamine copolymers, polydiallylamine hydrochloride, polymethyldiallylamine acetate, polymethyldiallylamine-amide sulfate, polymethyldiallylamine acetate, polydiallyldimethylammonium chloride, diallylamine acetate-sulfur dioxide copolymers, diallylmethylethylammonium ethyl sulfate-sulfur dioxide copolymers, methyldiallylamine hydrochloride-sulfur dioxide copolymers, diallyldimethylammonium chloride-sulfur dioxide copolymers, and diallyldimethylammonium chloride-acrylamide copolymers. The cationic allylamine resins may be commercial products, for example, PAA-HCL-01, PAA-HCL-03, PAA-HCL-05, PAA-HCL-3L, PAA-HCL-10L, PAA-H-HCL, PAA-SA, PAA-01, PAA-03, PAA-05, PAA-08, PAA-15, PAA-15C, PAA-25, PAA-H-10C, PAA-D11-HCL, PAA-D41-HCL, PAA-D19-HCL, PAS-21CL, PAS-M-1L, PAS-M-1, PAS-22SA, PAS-M-1A, PAS-H-1L, PAS-H-5L, PAS-H-10L, PAS-92, PAS-92A, PAS-J-81L, and PAS-J-81 (trade names, manufactured by Nittobo Medical Co., Ltd.), Hymo Neo-600, Himoloc Q-101, Q-311, and Q-501, and Himax SC-505 (trade names, manufactured by Hymo Corporation).

Examples of the cationic surfactants include primary, secondary, and tertiary amine salt compounds, alkylamine salts, dialkylamine salts, aliphatic amine salts, benzalkonium salts, quaternary ammonium salts, quaternary alkylammonium salts, alkylpyridinium salts, sulfonium salts, phosphonium salts, onium salts, and imidazolinium salts. Specific examples of the cationic surfactants include hydrochlorides and acetates of lauryl amine, coconut amine, and rosin amine, lauryltrimethylammonium chloride, cetyltrimethylammonium chloride, benzyltributylammonium chloride, benzalkonium chloride, dimethylethyllaurylammoniumethyl sulfate, dimethylethyloctylammoniumethyl sulfate, trimethyllaurylammonium hydrochloride, cetylpyridinium chloride, cetylpyridinium bromide, dihydroxyethyllauryl amine, decyldimethylbenzylammonium chloride, dodecyldimethylbenzylammonium chloride, tetradecyldimethylammonium chloride, hexadecyldimethylammonium chloride, and octadecyldimethylammonium chloride.

Depending on the pretreatment method, water, a water-soluble organic solvent, a surfactant, a pH-adjusting agent, a preservative or fungicide, an anticorrosive, a chelating agent, and/or a resin may be added to the pretreatment agent.

When the pretreatment agent is applied to a textile, the amount of coagulant to be deposited in the pretreatment agent may range from 0.02 to 0.5 $g/cm^2$ or 0.02 to 0.24 $g/cm^2$. An amount of coagulant to be deposited in these ranges results in more uniform application of the coagulant to a textile, an image with improved scratch resistance, and less ink bleeding on the textile.

1.5. White Ink Composition for Ink Jet Textile Printing

A white ink composition for use in the ink jet recording method according to the present embodiment contains a white pigment and water. Components that are contained or may be contained in the white ink composition are described in detail below.

1.5.1. White Pigment

The white pigment in the white ink composition may be, but is not limited to, an inorganic pigment, such as titanium oxide, zinc oxide, zinc sulfide, antimony oxide, or zirconium oxide, or an organic pigment, such as hollow resin particles or polymer particles. Among these, titanium oxide has high chromaticity, high hiding power, and a good dispersion particle size, as well as high visibility (brightness). These white pigments may be used alone or in combination.

Among titanium oxides, a typical white pigment is rutile titanium oxide. The rutile titanium oxide may be made in-house or may be commercially available. An industrial production method for producing rutile titanium oxide in-house may be a sulfuric acid method or a chlorine method. Examples of commercial rutile titanium oxides include Tipaque (registered trademark) CR-60-2, CR-67, R-980, R-780, R-850, R-980, R-630, R-670, and PF-736 (manufactured by Ishihara Sangyo Kaisha, Ltd.).

Titanium oxide may have a 50% average particle size (hereinafter referred to also as "D50") in the range of 50 to 500 nm or 150 to 350 nm. D50 in these ranges results in printed materials with high scratch resistance and images with high visibility, thus resulting in high-quality images.

The term "50% average particle size of titanium oxide", as used herein, refers to D50 of titanium oxide in the white ink composition rather than D50 of titanium oxide before the white ink composition is prepared. The term "50% average particle size", as used herein, refers to a spherical 50% average particle size determined by dynamic light scattering as described below.

Particles in a dispersion medium are irradiated with light, and generated diffracted and scattered light is measured with detectors located in front of, at the sides of, and behind the dispersion medium. A cumulative curve is made from the measured values on the assumption that the amorphous particles are spherical and that the total volume of particles converted to a sphere with the same volume as the particles is 100%. The value at the 50% cumulative value is taken as the "spherical 50% average particle size determined by dynamic light scattering".

The white pigment content depends on the type of pigment and may range from 1% to 20% by mass or 5% to 13% by mass of the total mass of the ink composition in order to reduce sedimentation and to improve the hiding power and color reproducibility of images.

The lower limit of the density of the white ink composition used in the present embodiment may be 1.12 $g/cm^3$, 1.13 $g/cm^3$, 1.14 $g/cm^3$, or 1.15 $g/cm^3$. The upper limit of the density of the white ink composition used in the present embodiment may be 2.0 $g/cm^3$, 1.8 $g/cm^3$, or 1.5 $g/cm^3$. A density of the white ink composition in these ranges results in a coalescent ink droplet with increased kinetic energy. Violent collision of such an ink droplet with a textile surface causes the whole ink droplet to be uniformly mixed with a pretreatment agent in the textile and further promotes the reaction. The density of the white ink composition tends to depend on the type of white pigment and the white pigment content. Thus, the density of the white ink composition can be appropriately controlled by changing the type of white pigment and the white pigment content.

1.5.2. Water

A white ink composition for use in the ink jet recording method according to the present embodiment contains water as an aqueous solvent. The water may be, but is not limited to, pure water, such as ion-exchanged water, ultrafiltered water, reverse osmosis water, or distilled water, or ultrapure water.

The water content may range from 20% to 80% by mass of the total mass of the ink composition. The water content not only refers to the amount of added water but also includes water contained in the others additive agents.

1.5.3. Other Additive Agents

A white ink composition for use in the ink jet recording method according to the present embodiment may contain a resin dispersant, resin particles, a water-soluble organic solvent, a surfactant, a pH-adjusting agent, a preservative, a fungicide, an anticorrosive, a chelating agent, a viscosity modifier, a dissolution aid, and/or an antioxidant, as required.

<Resin Dispersant>

To prepare a white ink composition, a white pigment may be dispersed to prepare a pigment dispersion liquid, and the pigment dispersion liquid may be mixed with another material dispersion liquid. Such a pigment dispersion liquid may be prepared by dispersing a self-dispersing pigment in a dispersion medium without using a dispersant, by dispersing a white pigment in a dispersion medium using a resin dispersant, or by dispersing a surface-treated white pigment in a dispersion medium.

Among these, examples of the resin dispersant include, but are not limited to, poly(vinyl alcohol)s, polyvinylpyrrolidones, poly(acrylic acid), acrylic acid-acrylonitrile copolymers, vinyl acetate-acrylate copolymers, acrylic acid-acrylate copolymers, styrene-acrylic acid copolymers, styrene-methacrylic acid copolymers, styrene-methacrylic acid-acrylate copolymers, styrene-α-methylstyrene-acrylic acid copolymers, styrene-α-methylstyrene-acrylic acid-acrylate copolymers, styrene-maleic acid copolymers, styrene-maleic anhydride copolymers, vinylnaphthalene-acrylic acid copolymers, vinylnaphthalene-maleic acid copolymers, vinyl acetate-maleate copolymers, vinyl acetate-crotonic acid copolymers, vinyl acetate-acrylic acid copolymers, and salts thereof. Among these, the resin dispersant may be a copolymer composed of a monomer having a hydrophobic functional group and a monomer having a hydrophilic functional group or a polymer composed of a monomer having both a hydrophobic functional group and a hydrophilic functional group. The copolymers may be random copolymers, block copolymers, alternating copolymers, or graft copolymers.

The resin dispersant may be commercially available. Specific examples include Joncryl 67 (weight-average molecular weight: 12,500, acid value: 213), Joncryl 678 (weight-average molecular weight: 8,500, acid value: 215), Joncryl 586 (weight-average molecular weight: 4,600, acid value: 108), Joncryl 611 (weight-average molecular weight: 8,100, acid value: 53), Joncryl 680 (weight-average molecular weight: 4,900, acid value: 215), Joncryl 682 (weight-average molecular weight: 1,700, acid value: 238), Joncryl 683 (weight-average molecular weight: 8,000, acid value: 160), and Joncryl 690 (weight-average molecular weight: 16,500, acid value: 240) (trade names, manufactured by BASF Japan Ltd.).

<Resin Particles>

The white ink composition used in the present embodiment may further contain resin particles. As the ink is dried, resin particles tend to further improve the scratch resistance and washing fastness of an image area on a printed textile because the resin particles or the resin particles and a white pigment are fused together and make the white pigment adhere to the textile. The resin particles may be an emulsion or solution. A resin particle emulsion can suppress an increase in the viscosity of the ink.

Examples of the resin of the resin particles include acrylic resins, styrene-acrylic resins, fluorene resins, urethane resins, polyolefin resins, rosin-modified resins, terpene resins, polyester resins, polyamide resins, epoxy resins, vinyl chloride resins, vinyl chloride-vinyl acetate copolymers, and ethylene-vinyl acetate resins. These resins may be used alone or in combination. Among these resins, at least one selected from urethane resins and acrylic resins has high design flexibility and can consequently achieve desired physical properties, and urethane resins improve scratch resistance.

The urethane resins may be polyether urethane resins with an ether bond, polyester urethane resins with an ester bond, or polycarbonate urethane resins with a carbonate bond. The elongation at break and 100% modulus of a urethane resin with a cross-linking group after cross-linking can be adjusted by changing the density of cross-linking sites and the type of main chain. Among these urethane resins, urethane resins with a polycarbonate or polyether backbone and with a cross-linking group have a good balance of elongation at break and 100% modulus and easily improve the scratch resistance of an image and the feel and texture of a printed textile.

Among the urethane resins, urethane resins with a polycarbonate backbone and with a cross-linking group can react with a coagulant contained in the pretreatment agent. Such urethane resin particles react with a coagulant and form a film on a textile, thereby improving the scratch resistance of an image and preventing ink bleeding on the textile.

The cross-linking group may be an isocyanate group or a silanol group, and the isocyanate group may be chemically protected (referred to as a "blocked isocyanate group"). A blocked isocyanate group is deblocked and activated by heating and can form a urethane bond, a urea bond, or an allophanate bond, for example.

A urethane resin with a cross-linking group may have three or more cross-linking groups per molecule, and the reaction of the cross-linking groups forms a cross-linked structure. The term "urethane resins", as used herein, refers to resins with a urethane bond, a urea bond, or an allophanate bond formed by a reaction between an isocyanate group and another reactive group (for example, a hydroxy group, an amino group, a urethane linking group, or a carboxy group). Thus, urethane resins in the present specification include urea resins, for example. Urethane resins may be compounds with a urethane bond produced by a reaction between a compound with an isocyanate group and a compound with a hydroxy group.

Blocked isocyanates have a masked isocyanate group formed by blocking an isocyanate group with a blocking agent and may be produced by a reaction between a polyisocyanate compound and a blocking agent.

The polyisocyanate compound may be a polyisocyanate monomer or a polyisocyanate derivative. The polyisocyanate monomer may be a polyisocyanate, such as an aromatic polyisocyanate, an araliphatic polyisocyanate, an aliphatic polyisocyanate, or an alicyclic polyisocyanate. These polyisocyanate monomers may be used alone or in combination.

The polyisocyanate derivative may be a multimer, dimer, trimer, such as an isocyanurate modified product or an iminooxadiazinedione modified product, pentamer, or heptamer of the polyisocyanate monomer, an allophanate modified product, such as an allophanate modified product produced by a reaction between the polyisocyanate monomer and a low-molecular-weight polyol described later, a polyol modified product, such as a polyol modified product produced by a reaction between the polyisocyanate monomer and a low-molecular-weight polyol described later (an alcohol adduct), a biuret modified product, such as a biuret modified product produced by a reaction between the polyisocyanate monomer and water or an amine, a urea modified product, such as a urea modified product produced by a reaction between the polyisocyanate monomer and a diamine, an oxadiazinetrione modified product, such as an oxadiazinetrione produced by a reaction between the polyisocyanate monomer and carbon dioxide, a carbodiimide modified product, such as a carbodiimide modified product produced by a decarboxylation condensation reaction of the polyisocyanate monomer, a uretdione modified product, or an uretonimine modified product.

When two or more polyisocyanate compounds are used in combination, for example, two or more of the polyisocyanate compounds may be simultaneously reacted in the production of a blocked isocyanate, or blocked isocyanates produced from each polyisocyanate compound may be mixed together.

A blocking agent blocks and inactivates an isocyanate group, regenerates or activates an isocyanate group after deblocking, and also has a catalytic action that activates an isocyanate group in a blocked or deblocked state.

The blocking agent may be an imidazole compound, an imidazoline compound, a pyrimidine compound, a guanidine compound, an alcohol compound, a phenolic compound, an active methylene compound, an amine compound, an imine compound, an oxime compound, a carbamic acid compound, a urea compound, an acid amide (lactam) compound, an acid imide compound, a triazole compound, a pyrazole compound, a mercaptan compound, or a bisulfite.

The blocking agent is described below in detail. Some exemplified compounds are described along with a dissociation temperature as a temperature for regenerating an isocyanate group.

Examples of the imidazole compound include imidazole (dissociation temperature: 100° C.), benzimidazole (dissociation temperature: 120° C.), 2-methylimidazole (dissociation temperature: 70° C.), 4-methylimidazole (dissociation temperature: 100° C.), 2-ethylimidazole (dissociation temperature: 70° C.), 2-isopropylimidazole, 2,4-dimethylimidazole, and 2-ethyl-4-methylimidazole.

Examples of the imidazoline compound include 2-methylimidazoline (dissociation temperature: 110° C.) and 2-phenylimidazoline.

Examples of the pyrimidine compound include 2-methyl-1,4,5,6-tetrahydropyrimidine.

Examples of the guanidine compound include 3,3-dialkylguanidines, such as 3,3-dimethylguanidine, 1,1,3,3-tetraalkylguanidines, such as 1,1,3,3-tetramethylguanidine (dissociation temperature: 120° C.), and 1,5,7-triazabicyclo[4.4.0]deca-5-ene.

Examples of the alcohol compound include methanol, ethanol, 2-propanol, n-butanol, s-butanol, 2-ethylhexyl alcohol, 1- or 2-octanol, cyclohexyl alcohol, ethylene glycol, benzyl alcohol, 2,2,2-trifluoroethanol, 2,2,2-trichloroethanol, 2-(hydroxymethyl)furan, 2-methoxyethanol, methoxypropanol, 2-ethoxyethanol, n-propoxyethanol, 2-butoxyethanol, 2-ethoxyethoxyethanol, 2-ethoxybutoxyethanol, butoxyethoxyethanol, 2-butoxyethylethanol, 2-butoxyethoxyethanol, N,N-dibutyl-2-hydroxyacetamide, N-hydroxysuccinimide, N-morpholine ethanol, 2,2-dimethyl-1,3-dioxolane-4-methanol, 3-oxazolidineethanol, 2-hydroxymethylpyridine (dissociation temperature: 140° C.), furfuryl alcohol, 12-hydroxystearic acid, triphenyl silanol, and 2-hydroxyethyl methacrylate.

Examples of the phenolic compound include phenol, cresol, ethylphenol, n-propylphenol, isopropylphenol, n-butylphenol, s-butylphenol, t-butylphenol, n-hexylphenol, 2-ethylhexylphenol, n-octylphenol, n-nonylphenol, di-n-propylphenol, diisopropylphenol, isopropyl cresol, di-n-butylphenol, di-s-butylphenol, di-t-butylphenol, di-n-octylphenol, di-2-ethylhexylphenol, di-n-nonylphenol, nitrophenol, bromophenol, chlorophenol, fluorophenol, dimethylphenol, styrenated phenol, methyl salicylate, 4-methyl hydroxybenzoate, benzyl 4-hydroxybenzoate, 2-ethylhexyl hydroxybenzoate, 4-[(dimethylamino)methyl]phenol, 4-[(dimethylamino)methyl]nonylphenol, bis(4-hydroxyphenyl) acetic acid, 2-hydroxypyridine (dissociation temperature: 80° C.), 2- or 8-hydroxyquinoline, 2-chloro-3-pyridinol, and pyridine-2-thiol (dissociation temperature: 70° C.)

Examples of the active methylene compound include Meldrum's acid, dialkyl malonates, such as dimethyl malonate, diethyl malonate, di-n-butyl malonate, di-t-butyl malonate, di-2-ethylhexyl malonate, methyl n-butyl malonate, ethyl n-butyl malonate, methyl s-butyl malonate, ethyl s-butyl malonate, methyl t-butyl malonate, ethyl t-butyl malonate, diethyl methylmalonate, dibenzyl malonate, diphenyl malonate, benzyl methyl malonate, ethyl phenyl malonate, t-butyl phenyl malonate, and isopropylidene malonate, alkyl acetoacetates, such as methyl acetoacetate, ethyl acetoacetate, n-propyl acetoacetate, isopropyl acetoacetate, n-butyl acetoacetate, t-butyl acetoacetate, benzyl acetoacetate, and phenyl acetoacetate, 2-acetoacetoxyethyl methacrylate, acetylacetone, and ethyl cyanoacetate.

Examples of the amine compound include dibutylamine, diphenylamine, aniline, N-methylaniline, carbazole, bis(2,2,6,6-tetramethylpiperidinyl)amine, di-n-propylamine, diisopropylamine (dissociation temperature: 130° C.), isopropylethylamine, 2,2,4- or 2,2,5-trimethylhexamethyleneamine, N-isopropylcyclohexylamine (dissociation temperature: 140° C.), dicyclohexylamine (dissociation temperature: 130° C.), bis(3,5,5-trimethylcyclohexyl)amine, piperidine, 2,6-dimethylpiperidine (dissociation temperature: 130° C.), t-butylmethylamine, t-butylethylamine (dissociation temperature: 120° C.), t-butylpropylamine, t-butylbutylamine, t-butylbenzylamine (dissociation temperature: 120° C.), t-butylphenylamine, 2,2,6-trimethylpiperidine, 2,2,6,6-tetramethylpiperidine (dissociation temperature: 80° C.), (dimethylamino)-2,2,6,6-tetramethylpiperidine, 2,2,6,6-tetramethyl-4-piperidine, 6-methyl-2-piperidine, and 6-aminocaproic acid.

Examples of the imine compound include ethyleneimine, polyethyleneimine, 1,4,5,6-tetrahydropyrimidine, and guanidine.

Examples of the oxime compound include formaldoxime, acetaldoxime, acetoxime, methyl ethyl ketoxime (dissociation temperature: 130° C.), cyclohexanone oxime, diacetylmonoxime, benzophenoxime, 2,2,6,6-tetramethylcyclohexanone oxime, diisopropyl ketone oxime, methyl t-butyl ketone oxime, diisobutyl ketone oxime, methyl isobutyl ketone oxime, methyl isopropyl ketone oxime, methyl 2,4-dimethylpentyl ketone oxime, methyl 3-ethylheptyl ketone oxime, methyl isoamyl ketone oxime, n-amyl ketone oxime, 2,2,4,4-tetramethyl-1,3-cyclobutanedione monoxime, 4,4'-dimethoxybenzophenone oxime, and 2-heptanone oxime.

Examples of the carbamic acid compound include N-phenylcarbamic acid phenyl.

Examples of the urea compound include urea, thiourea, and ethylene urea.

Examples of the acid amide (lactam) compound include acetanilide, N-methylacetamide, acetic acid amide, ε-caprolactam, δ-valerolactam, γ-butyrolactam, pyrrolidone, 2,5-piperazinedione, and laurolactam.

Examples of the acid imide compound include succinic acid imide, maleic acid imide, and phthalimide.

Examples of the triazole compound include 1,2,4-triazole and benzotriazole.

Examples of the pyrazole compound include pyrazole, 3,5-dimethylpyrazole (dissociation temperature: 120° C.), 3,5-diisopropylpyrazole, 3,5-diphenylpyrazole, 3,5-di-t-butylpyrazole, 3-methylpyrazole, 4-benzyl-3,5-dimethylpyrazole, 4-nitro-3,5-dimethylpyrazole, 4-bromo-3,5-dimethylpyrazole, and 3-methyl-5-phenylpyrazole.

Examples of the mercaptan compound include butyl mercaptan, dodecyl mercaptan, and hexyl mercaptan.

Examples of the bisulfite include sodium bisulfite.

The blocking agent is not limited to these and may also be benzoxazolone, isatoic anhydride, or tetrabutyl phosphonium acetate.

These blocking agents may be used alone or in combination. A blocking agent with any dissociation temperature may be appropriately selected. The dissociation temperature may range from 60° C. to 230° C., 80° C. to 200° C., 100° C. to 180° C., or 110° C. to 160° C. These temperature ranges can result in a white ink composition with a sufficiently long pot life and do not require excessively high temperatures in the heating process.

For a urethane resin with a cross-linking group after cross-linking, the elongation at break may be 150% or more, 170% or more, 200% or more, or 300% or more. Appropriately selecting the density of cross-linking sites and the type of main chain to achieve such an elongation at break can improve the feel and texture of printed materials.

The elongation at break may be measured at a tensile test gauge length of 20 mm and at a crosshead speed of 100 mm/min in a film with a thickness of approximately 60 μm formed by curing an emulsion of a urethane resin with a cross-linking group. The 100% modulus may be determined by measuring tensile stress when the film in the tensile test extends by 100% of the original length. The film may be formed from an emulsion of a urethane resin with a cross-linking group or may be formed by shaping a resin of the same type. In particular, the film may be formed from an emulsion resin.

The urethane resin with a cross-linking group may be formulated in the emulsion form. Such a resin emulsion is a self-reactive urethane resin emulsion and may be a commercial emulsion of a urethane resin with an isocyanate group blocked with a blocking agent with a hydrophilic group.

Examples of commercial urethane resins with a cross-linking group include Takelac WS-6021 (trade name, manufactured by Mitsui Chemicals & SKC Polyurethanes Inc., urethane resin emulsion, a polyether polyurethane with a polyether-derived backbone), WS-5100 (trade name, manufactured by Mitsui Chemicals & SKC Polyurethanes Inc., urethane resin emulsion, a polycarbonate polyurethane with a polycarbonate-derived backbone), Elastron E-37 and H-3 (polyester polyurethanes having a polyester-derived backbone in their main chains), Elastron H-38, BAP, C-52, F-29, and W-11P (polyether polyurethanes having a polyether-derived backbone in their main chains) (trade names, manufactured by Dai-ichi Kogyo Seiyaku Co., Ltd., urethane resin emulsions), Superflex 870, 800, 150, 420, 460, 470, 610, and 700 (trade names, manufactured by Dai-ichi Kogyo Seiyaku Co., Ltd., urethane resin emulsions), Permarin UA-150 (trade name, manufactured by Sanyo Chemical Industries, Ltd., urethane resin emulsion), Sancure 2710 (trade name, manufactured by Lubrizol Japan Limited, urethane resin emulsion), NeoRez R-9660, R-9637, and R-940 (trade names, manufactured by Kusumoto Chemicals, Ltd., urethane resin emulsions), and Adeka Bontighter HUX-380 and 290K (trade names, manufactured by Adeka Corporation, urethane resin emulsions).

In the present embodiment, the resin particle content based on the solid content may be 1% or more by mass, 3% or more by mass, or 8% or more by mass of the total mass of the ink. The upper limit of the resin particle content may be 20% or less by mass, 15% or less by mass, or 12% or less by mass. A resin particle content in these ranges results in printed materials with high chromaticity and results in high print reliability and storage stability.

The resin particles may be contained in a pretreatment liquid, if present. In such a case, the resin particles in the pretreatment liquid may be the same as or different from the resin particles in the white ink composition.

In consideration of the deblocking temperature or dissociation temperature of an isocyanate group in a urethane resin with a cross-linking group, the temperature of a heating process described later is set to activate at least part of the cross-linking group.

<Water-Soluble Organic Solvent>

The white ink composition used in the present embodiment may contain a water-soluble organic solvent. The use of a water-soluble organic solvent can further improve print reliability in recording, improve the drying characteristics of the ink composition, and provide an image with high chromaticity and scratch resistance.

Examples of the water-soluble organic solvent usable in the present embodiment include polyol compounds, glycol ethers, nitrogen-containing solvents, and betaine compounds.

Examples of the polyol compounds include polyol compounds, such as diol compounds, having 2 to 6 carbon atoms in the molecule and optionally having one ether bond in the molecule. Specific examples include 1,2-pentanediol, triethylene glycol monomethyl ether, triethylene glycol monobutyl ether, diethylene glycol monobutyl ether, dipropylene glycol monopropyl ether, glycerin, 1,2-hexanediol, 1,2-heptanediol, 1,3-propanediol, 1,2-butanediol, 1,3-butanediol, 1,4-butanediol, 2,3-butanediol, 2-methyl-3-phenoxy-1,2-propanediol, 3-(3-methylphenoxy)-1,2-propanediol, 3-hexyloxy-1,2-propanediol, 2-hydroxymethyl-2-phenoxymethyl-1,3-propanediol, 3-methyl-1,3-butanediol, 1,3-propanediol, 1,2-butanediol, 1,2-pentanediol, 1,4-butanediol, 1,5-pentanediol, 1,6-hexanediol, 2-methyl-2,4-pentanediol, and 3-methyl-1,5-pentanediol.

Examples of the glycol ethers include a glycol monoalkyl ether selected from ethylene glycol, diethylene glycol, triethylene glycol, poly(ethylene glycol), propylene glycol, dipropylene glycol, tripropylene glycol, poly(propylene glycol), and polyoxyethylene polyoxypropylene glycol.

Examples of the nitrogen-containing solvents include N-methyl-2-pyrrolidone, N-ethyl-2-pyrrolidone, N-vinyl-2-pyrrolidone, 2-pyrrolidone, N-butyl-2-pyrrolidone, and 5-methyl-2-pyrrolidone. These nitrogen-containing solvents may be used alone or in combination. The nitrogen-containing solvents can act as good solubilizers for resins, provide images with high scratch resistance, and prevent clogging of ink jet heads and nozzles.

Other examples of the nitrogen-containing solvents include alkoxyalkylamides, for example, 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-iso-propoxy-N,N-dimethylpropionamide, 3-iso-propoxy-N,N-diethylpropionamide, 3-iso-propoxy-N,N-methylethylpropionamide, 3-tert-butoxy-N,N-dimethylpropionamide, 3-tert-butoxy-N,N-diethylpropionamide, and 3-tert-butoxy-N,N-methylethylpropionamide.

The betaine compounds are compounds (intramolecular salts) with a positive charge and a negative charge at nonadjacent positions in the molecule and with no electric charge as the whole molecule, the atom(s) with the positive charge not being bonded to a dissociable hydrogen atom. The betaine compounds are N-alkyl substitution products of amino acids and N-trialkyl substitution products of amino acids. Examples of the betaine compounds include trimethylglycine (also referred to as "glycine betaine"), γ-butyrobetaine, homarine, trigonelline, carnitine, homoserine betaine, valine betaine, lysine betaine, ornithine betaine, alanine betaine, stachydrine, and glutamate betaine, in particular trimethylglycine.

The water-soluble organic solvent may have a normal boiling point of 200° C. or more, 220° C. or more, 240° C. or more, or 280° C. or more. The water-soluble organic solvent may have a normal boiling point of 300° C. or less. A water-soluble organic solvent with a normal boiling point in these ranges can improve the ejection reliability of the ink composition.

In the present embodiment, a high-boiling organic solvent with a normal boiling point of 280° C. or more, such as triethylene glycol or glycerin, has a high moisturizing effect, prevents ink jet heads from drying, and stabilizes ejection. In particular, although a high-boiling organic solvent glycerin has a high moisturizing effect, glycerin may remain in a coating film due to its high boiling point. Glycerin in pigment printing, however, is less likely to remain in the coating film due to high-temperature drying after recording.

In the present embodiment, water-soluble organic solvents may be used alone or in combination. The water-soluble organic solvent may be added to achieve a desired viscosity and surface tension of ink described later. The water-soluble organic solvent content may be 5% or more by mass, 10% or more by mass, or 15% or more by mass of the total mass of the ink. The water-soluble organic solvent content may be 35% or less by mass, 30% or less by mass, or 25% or less by mass of the total mass of the white ink composition.

In particular, in the present embodiment, the amount of a water-soluble organic solvent with a normal boiling point of 280° C. or more may be 5% or more by mass, 10% or more by mass, or 15% or more by mass of the total mass of the ink. A high-boiling organic solvent content in these ranges can result in higher ejection reliability.

<Surfactant>

The white ink composition used in the present embodiment may contain a surfactant. The surfactant may be at least one of acetylenic glycol surfactants, acetylenic alcohol surfactants, and polysiloxane surfactants. These surfactants in the white ink composition can further improve the drying characteristics of the white ink composition on a textile and enable high-speed printing.

Among these, polysiloxane surfactants have high solubility in the ink composition.

The acetylenic glycol surfactants and acetylenic alcohol surfactants may be, but are not limited to, at least one selected from 2,4,7,9-tetramethyl-5-decyne-4,7-diol, alkylene oxide adducts of 2,4,7,9-tetramethyl-5-decyne-4,7-diol, 2,4-dimethyl-5-decyne-4-ol, and alkylene oxide adducts of 2,4-dimethyl-5-decyne-4-ol. These are available as commercial products, such as Olfin 104 series and E series, such as Olfin E1010 (manufactured by Air Products Japan, Inc., trade names), and Surfynol 465 and Surfynol 61 (manufactured by Nissin Chemical Industry Co., Ltd., trade names).

The polysiloxane surfactants include BYK-347 and BYK-348 (manufactured by BYK Japan KK, trade names).

In the white ink composition in the present embodiment, the surfactant content may range from 0.1% to 3% by mass of the total mass of the ink.

1.6. Non-White Ink Composition for Ink Jet Textile Printing

In the ink jet recording method according to the present embodiment, a non-white ink composition may further be used. The non-white ink composition contains a non-white pigment and water. The non-white ink composition may be the same as the white ink composition except that the non-white ink composition contains the non-white pigment instead of the white pigment. The non-white ink composition may contain resin particles that react with a pretreatment agent.

The non-white pigment may be a known organic or inorganic pigment. Examples of the organic pigment include azo pigments, such as azo lake pigments, insoluble azo pigments, condensed azo pigments, and chelate azo pigments, polycyclic pigments, such as phthalocyanine pigments, perylene pigments, perinone pigments, anthraquinone pigments, quinacridone pigments, dioxazine pigments, thioindigo pigments, isoindolinone pigments, isoindoline pigments, quinophthalone pigments, and diketopyrrolopyrrole pigments, dye lake pigments, such as basic dye lake pigments and acidic dye lake pigments, nitro pigments, nitroso pigments, aniline black, and daylight fluorescent pigments. Examples of the inorganic pigment include metal oxide pigments, such as titanium dioxide, zinc oxide, and chromium oxide, and carbon black. Luster pigments, such as pearl pigments and metallic pigments, may also be used.

For example, black pigments for black ink compositions may be C.I. Pigment Black 1, 7, and 11. C.I. stands for "Color Index Generic Name". Among these, a black pigment for ink jet textile printing may be C.I. Pigment Black 7, which is carbon black that has a relatively low specific gravity and rarely precipitates in an aqueous medium.

Examples of pigments other than black ink compositions include C.I. Pigment Yellow 1, 3, 12, 13, 14, 17, 24, 34, 35, 37, 42, 53, 55, 74, 81, 83, 95, 97, 98, 100, 101, 104, 108, 109, 110, 117, 120, 138, 153, 155, and 180, C.I. Pigment Red 1, 2, 3, 5, 17, 22, 23, 31, 38, 48:2 (Permanent Red 2B (Ba)), 48:2 (Permanent Red 2B (Ca)), 48:3, 48:4, 49:1, 52:2, 53:1, 57:1, 60:1, 63:1, 63:2, 64:1, 81, 83, 88, 101, 104, 105, 106, 108, 112, 114, 122, 123, 146, 149, 166, 168, 170, 172, 177, 178, 179, 185, 190, 193, 209, and 219, C.I. Pigment Violet 19 and 23, C.I. Pigment Blue 1, 2, 15, 15:1, 15:2, 15:3, 15:4, 15:6, 16, 17:1, 56, 60, and 63, and C.I. Pigment Green 1, 4, 7, 8, 10, 17, 18, and 36.

These pigments may be used alone or in combination. The pigments may have an average particle size of 5 μm or less, 0.3 μm or less, or 0.01 μm to 0.15 μm. A pigment with an average particle size in these ranges ensures the ejection stability of an ink jet head and can have improved chromaticity in printed materials.

2. Examples

Although the present disclosure is further described with examples, the present disclosure is not limited to these examples. Unless otherwise specified, "%" is based on mass.

2.1. Preparation of White Ink Composition

The materials of the composition in Table 1 were well mixed to prepare white ink compositions Ink-W1 to Ink-W4. The contents in the table are expressed in % by mass. The amounts of pigment dispersion liquid and resin dispersion liquid are based on the solid content.

TABLE 1

| | Ink formulation | | Ink-W1 | Ink-W2 | Ink-W3 | Ink-W4 |
|---|---|---|---|---|---|---|
| White ink | Pigment dispersion | Titanium oxide slurry | 9 | 9 | 0 | 9 |
| | | Hollow resin fine particles | 0 | 0 | 9 | 0 |
| | Resin dispersion | Takelac WS-6021 (reactive resin) | 7 | 9 | 7 | 0 |
| | | Takelac W-635 (nonreactive resin) | 0 | 0 | 0 | 7 |
| | Solvent | 2-pyrrolidone | 2 | 2 | 2 | 2 |
| | | Glycerin | 7 | 5 | 7 | 7 |
| | | Triethylene glycol | 5 | 5 | 5 | 5 |
| | | Triethylene glycol monobutyl ether | 1 | 1 | 1 | 1 |
| | Surfactant | BYK-348 | 0.3 | 0.3 | 0.3 | 0.3 |
| | Ion-exchanged water | | Remainder | Remainder | Remainder | Remainder |

The materials of the white ink compositions in Table 1 are described below.

<Pigment Dispersion Liquid>

Titanium dioxide slurry: trade name "NanoTek® Slurry", manufactured by C.I. Kasei Co., Ltd., titanium dioxide solid content 20%, average particle size 250 nm Hollow resin fine particles: trade name "Ropaque OP-62", manufactured by Rohm and Haas, solid content 38%, hollow polymer particles formed of styrene-acrylic copolymer <Solvent>

2-pyrrolidone: manufactured by Kanto Chemical Co., Inc.

Glycerin: manufactured by Sakamoto Yakuhin Kogyo Co., Ltd.

Triethylene glycol: manufactured by Kanto Chemical Co., Inc.

Triethylene glycol monobutyl ether: manufactured by Kanto Chemical Co., Inc.

<Resin Dispersion Liquid>

Takelac WS-6021: trade name, manufactured by Mitsui Chemicals Polyurethane Co., Ltd., solid content 30% by mass, emulsion of a urethane resin with a self-cross-linking group and with a polyether backbone Takelac W-635: trade name, manufactured by Mitsui Chemicals Polyurethane Co., Ltd., solid content 30% by mass, emulsion of a urethane resin with a polyoxyethylene group

19

<Surfactant>

BYK-348: trade name, manufactured by BYK, silicon surfactant

2.2. Preparation of Color Ink Composition

The materials of the composition in Table 2 were well mixed to prepare a color ink composition Ink-C1. The contents in the table are expressed in % by mass. The amounts of pigment dispersion liquid and resin dispersion liquid are based on the solid content.

TABLE 2

| | Ink formulation | | Ink-C1 |
|---|---|---|---|
| Color ink | Pigment dispersion | Cyan pigment (C.I. Pigment Blue 15:3 Clariant) | 4 |
| | Resin dispersion | Takelac WS-6021 (reactive resin) | 4 |
| | | Takelac W-635 (nonreactive resin) | 0 |
| | Solvent | 2-pyrrolidone | 2 |
| | | Glycerin | 10 |
| | | Triethylene glycol | 5 |
| | | Triethylene glycol monobutyl ether | 1 |
| | Surfactant | BYK-348 | 0.3 |
| | Ion-exchanged water | | Remainder |

The pigment dispersion liquid of the cyan pigment in Table 2 was prepared as described below. The resin dispersion liquid, the solvent, and the surfactant were described in the white ink composition.

A reaction vessel equipped with a stirrer, a thermometer, a reflux tube, and a dropping funnel was purged with nitrogen. 20 parts by mass of cyclohexyl acrylate, 5 parts by mass of 2-ethylhexyl acrylate, 15 parts by mass of butyl acrylate, 10 parts by mass of lauryl acrylate, 2 parts by mass of acrylic acid, and 0.3 parts by mass of t-dodecyl mercaptan were mixed. The liquid mixture was heated at 70° C. A dispersion polymer was produced in a polymerization reaction by adding dropwise the following raw materials contained in a dropping funnel to the reaction vessel for 4 hours: 150 parts by mass of cyclohexyl acrylate, 15 parts by mass of acrylic acid, 50 parts by mass of butyl acrylate, 1 part by mass of t-dodecyl mercaptan, 20 parts by mass of ethyl ethyl ketone, and 1 part by mass of azobisisovaleronitrile. Methyl ethyl ketone was added to the reaction vessel to prepare a 40% by mass dispersion polymer solution.

40 parts by mass of the dispersion polymer solution, 30 parts by mass of Pigment Blue 15:3 (a copper phthalocyanine pigment, manufactured by Clariant AG), 100 parts by mass of 0.1 mol/L aqueous sodium hydroxide, and 30 parts by mass of methyl ethyl ketone were mixed for 30 minutes in a homogenizer. 300 parts by mass of ion-exchanged water was then added to the mixture, and the mixture was stirred for another 1 hour. The whole methyl ethyl ketone and part of water were then evaporated with a rotatory evaporator. The product was neutralized to pH 9 with 0.1 mol/L sodium hydroxide and was passed through a 0.3-μm membrane filter. Thus, a cyan pigment dispersion liquid with a solid content of 15% by mass was prepared.

2.3. Preparation of Pretreatment Agent

The materials of the composition in Table 3 were well mixed to prepare pretreatment agents P1 to P3. The contents in the table are expressed in % by mass. The amounts of resin dispersion liquid, cationic polymer, and cationic surfactant are based on the solid content.

20

TABLE 3

| Ink formulation | | P1 | P2 | P3 |
|---|---|---|---|---|
| Pretreatment agent | Polyvalent metal salt | Calcium nitrate tetrahydrate | 10 | 0 | 0 |
| | Cationic polymer | Unisence KHE104L | 0 | 20 | 0 |
| | Cationic surfactant | Quartamin 24P | 0 | 0 | 20 |
| | Resin dispersion | Vinyblan 1245L (solid content 40%) | 1 | 1 | 1 |
| | Surfactant | Olfin E1010 | 0.1 | 0.1 | 0.1 |
| | Ion-exchanged water | | Remainder | Remainder | Remainder |

The materials of the pretreatment agents in Table 3 are described below.

<Polyvalent Metal Salt>

Calcium nitrate tetrahydrate:

<Cationic Polymer>

Unisence KHE104L: trade name, manufactured by SENKA corporation, solid content 20%, aqueous solution of dimethylamine-epichlorohydrin condensate <Cationic Surfactant>

Quartamin 24P: trade name, manufactured by Kao Corporation, solid content 30%, lauryltrimethylammonium chloride solution <Resin Dispersion Liquid>

Vinyblan 1245L: trade name, manufactured by Nissin Chemical Industry Co., Ltd., solid content 40%, vinyl acetate copolymer emulsion <Surfactant>

Olfin E1010: trade name, manufactured by Nissin Chemical Industry Co., Ltd., acetylene surfactant

2.4. Textile

The textile was a white cotton polyester blend fabric (cotton 75%, polyester 25%) of a T-shirt manufactured by Hanes.

2.5. Pretreatment Method

When a pretreated textile was used, the textile was subjected to pretreatment as described below. First, a sponge roller was sufficiently impregnated with a pretreatment agent listed in Table 3. The sponge roller was then rotated horizontally 3 or 4 times and approximately vertically 3 or 4 times on the surface of a chest portion (one side) of the T-shirt (textile). Approximately 20 g of the pretreatment agent per A4-size area was evenly applied. The T-shirt coated with the pretreatment agent was heat-dried at 170° C. for 45 seconds with a hot press machine (AF-54TEN, manufactured by Asahi Garment Machinery Co., Ltd., lower iron size 500 mm×400 mm). The pressing force of the hot press was 4.5 kN.

2.6. Ink Jet Recording Method

A printer SC-F2000 (manufactured by Seiko Epson Corporation) was modified before use (hereinafter referred to as a "modified SC-F2000"). The modifications were the installation of the following ejection mechanism and the installation of an upstream head and a downstream head in the sub-scanning direction in a head 2 shown in Table 4.

The print head had a single nozzle array with a nozzle density of 360 dpi. In the ejection mechanism, a drive pulse illustrated in FIG. 2 was applied to a piezoelectric device of each nozzle to eject ink from the nozzle. One recording cycle (frequency) was set to 7.2 kHz. The ejection frequency at which all the three pulse waveforms PW1 to PW3 in one recording cycle were applied to the piezoelectric device was set to 21.6 kHz (average). The carriage speed was adjusted for the dot forming density in the main scanning direction in each example. The number of ink droplets to be ejected was adjusted via the potential difference of the charging elements P13, P23, and P33 of the pulse waveforms PW1, PW2, and PW3. The ejection velocity Vm of ink droplets was adjusted via the gradients θ12, θ22, and θ32 of the charging elements P13, P23, and P33. The gradient can be increased to increase the ejection velocity.

The distance from a nozzle opening to a textile was adjusted by moving a recording medium support up and down. A 20 cm×20 cm pattern was deposited on an A4-size textile with the modified SC-F2000 by an ink jet method.

The head configuration was a head 1 or 2 shown in Table 4.

TABLE 4

| Head configuration | | Head 1 | Head 2 |
|---|---|---|---|
| Number of heads | | 1 | 2 |
| Mounted ink | Upstream head in sub-scanning direction | White ink Color ink | White ink |
| | Downstream head in sub-scanning direction | — | Color ink |

In the head 1 configuration, after only a white ink composition was ejected over a record image, a recording medium support was returned upstream in the sub-scanning direction, and then a color ink composition and the white ink composition were ejected over the record image. In the head 2 configuration, after a required amount of white ink composition was ejected from a head located upstream in the sub-scanning direction, a color ink was ejected from a head located downstream in the sub-scanning direction without returning a recording medium support upstream in the sub-scanning direction. The head 1 configuration takes a long printing time because white printing and color printing are separately performed. By contrast, the head 2 configuration takes a short printing time because white printing and color printing are almost continuously performed with two corresponding heads located on the same carriage.

A textile coated with the ink compositions was heated at 160° C. for 1 minute with a hot press machine to fix the ink compositions to the textile. Thus, a textile on which an image was formed (printed with ink) was produced 2.7. Evaluation 2.7.1. Average Ejection Velocity (Vm) of Ink Droplets The average ejection velocity (Vm) of ink droplets was determined by photographing the ink droplets with a high-speed camera from a side of the nozzle surface, measuring the transit time (s) of the ink droplet passing through a distance in the range of 0.5 to 1.0 mm between the nozzle opening and the textile, and calculating the average ejection velocity (Vm) from the measured value.

2.7.2. Amount of Mist Deposited around Head

After a stain on a nozzle surface of a head was removed with a cotton cloth wet with pure water, a white ink composition was applied to an A4-size textile at 200 mg/in$^2$ to form a 20 cm×20 cm pattern. The amount of white ink composition deposited on the nozzle surface of the head was visually observed and was rated according to the following criteria. The amount of deposited ink was determined from the dot forming density using the following formula.

Amount of deposited ink (mg/in$^2$)=amount of ink (ng) of ink droplet×dot forming density (dpi) in transverse direction×dot forming density (dpi) in longitudinal direction×10$^{-6}$ The evaluation criteria A and B are indicative of good results.

Evaluation Criteria

A: No stain of the white ink composition on the nozzle surface of the head.

B: A small amount of stain of the white ink composition on a portion of the nozzle surface of the head.

C: A large amount of stain of the white ink composition on the entire nozzle surface of the head.

2.7.3. Blurring of White Image

A white ink composition was applied to a textile at 10 to 200 mg/in$^2$ in increments of 10 mg to form a 1 cm×1 cm pattern. From a pattern with a smaller amount of deposited white ink, the patterns were visually inspected for blurring at a boundary between a white ink printed area and an unprinted area and were rated according to the following criteria.

Evaluation Criteria

S: Blurring at 160 mg/in$^2$ or more and no blurring at 150 mg/in$^2$ or less.

A: Blurring at 150 mg/in$^2$ or more and no blurring at 140 mg/in$^2$ or less.

B: Blurring at 140 mg/in$^2$ or more and no blurring at 130 mg/in$^2$ or less.

B$^-$: Blurring at 130 mg/in$^2$ or more and no blurring at 120 mg/in$^2$ or less.

C: Blurring at 120 mg/in$^2$ or less.

2.7.4. Blurring of Color Image Portion

A white ink composition was applied to a textile at 100 mg/in$^2$ to form a 20 cm×20 cm pattern. A cyan ink was applied to the pattern at 40 mg/in$^2$ to form a 15 cm×15 cm pattern. A boundary between the cyan ink printed area and a cyan ink unprinted area was visually inspected for blurring and was rated according to the following criteria.

Evaluation Criteria

S: No blurring.

A: Blurring in 20% or less of the boundary between the cyan ink printed area and the cyan ink unprinted area.

B: Blurring in more than 20% and 50% or less of the boundary between the cyan ink printed area and the cyan ink unprinted area.

C: Blurring in more than 50% of the boundary between the cyan ink printed area and the cyan ink unprinted area.

2.8. Results

Table 5 lists the recording conditions and evaluation results of the examples and comparative examples.

TABLE 5

| | | Example 1 | Example 2 | Example 3 | Example 4 | Example 5 | Example 6 | Example 7 |
|---|---|---|---|---|---|---|---|---|
| Head | Head configuration | Head 1 | Head 1 | Head 1 | Head 2 | Head 1 | Head 1 | Head 1 |
| Ink | White ink formulation | Ink-W1 | Ink-W1 | Ink-W1 | Ink-W1 | Ink-W1 | Ink-W1 | Ink-W2 |
| | White ink density (g/cm$^3$) | 1.15 | 1.15 | 1.15 | 1.15 | 1.15 | 1.15 | 1.15 |
| | Color ink formulation | Ink-C1 | Ink-C1 | Ink-C1 | Ink-C1 | Ink-C1 | Ink-C1 | Ink-C1 |

TABLE 5-continued

| | | | | | | | | |
|---|---|---|---|---|---|---|---|---|
| Pretreatment of textile | With or without pretreatment | With | With | With | With | With | With | With |
| | Pretreatment formulation | P1 | P1 | P1 | P1 | P2 | P3 | P1 |
| Print conditions | Distance from nozzle opening surface to textile (cm) | 0.5 | 0.5 | 0.5 | 0.5 | 0.5 | 0.5 | 0.5 |
| | Time to eject one ink droplet (µs) | 25.6 | 25.6 | 25.6 | 25.6 | 25.6 | 25.6 | 25.6 |
| Conditions for ejecting white ink droplet | Vm of first ink droplet (m/s) | 5.0 | 5.0 | 5.0 | 5.0 | 5.0 | 5.0 | 5.0 |
| | Vm of second ink droplet (m/s) | 5.3 | 5.3 | 5.3 | 5.3 | 5.3 | 5.3 | 5.3 |
| | Vm of third ink droplet (m/s) | 5.6 | — | 5.6 | 5.6 | 5.6 | 5.6 | 5.6 |
| | Weight of each droplet immediately after ejection (ng) | 9 | 9 | 5 | 9 | 9 | 9 | 9 |
| | Total weight of droplets after coalescence (ng) | 27 | 18 | 15 | 27 | 27 | 27 | 27 |
| Conditions for ejecting color ink droplet | Vm of ink droplet (m/s) | 5.0 | 5.0 | 5.0 | 5.0 | 5.0 | 5.0 | 5.0 |
| | Weight of ink droplet (ng) | 9 | 9 | 5 | 9 | 9 | 9 | 9 |
| Print quality | Amount of white ink mist deposited around head | A | B | B | A | A | A | A |
| | White ink bleeding | A | B | S | A | B | B⁻ | S |
| | Blurring of color image portion | S | A | S | B | A | B | S |

| | | Example 8 | Example 9 | Example 10 | Comparative example 1 | Comparative example 2 | Comparative example 3 |
|---|---|---|---|---|---|---|---|
| Head | Head configuration | Head 1 | Head 1 | Head 1 | Head 1 | Head 1 | Head 2 |
| Ink | White ink formulation | Ink-W3 | Ink-W4 | Ink-W1 | Ink-W1 | Ink-W1 | Ink-W1 |
| | White ink density (g/cm³) | 1.09 | 1.15 | 1.15 | 1.15 | 1.15 | 1.15 |
| | Color ink formulation | Ink-C1 | Ink-C1 | Ink-C1 | Ink-C1 | Ink-C1 | Ink-C1 |
| Pretreatment of textile | With or without pretreatment | With | With | Without | With | With | With |
| | Pretreatment formulation | P1 | P1 | — | P1 | P1 | P1 |
| Print conditions | Distance from nozzle opening surface to textile (cm) | 0.5 | 0.5 | 0.5 | 0.5 | 0.5 | 0.5 |
| | Time to eject one ink droplet (µs) | 25.6 | 25.6 | 25.6 | 25.6 | 76.9 | 25.6 |
| Conditions for ejecting white ink droplet | Vm of first ink droplet (m/s) | 5.0 | 5.0 | 5.0 | 5.0 | 5.0 | 5.0 |
| | Vm of second ink droplet (m/s) | 5.3 | 5.3 | 5.3 | 5.0 | — | 5.0 |
| | Vm of third ink droplet (m/s) | 5.6 | 5.6 | 5.6 | 5.0 | — | 5.0 |
| | Weight of each droplet immediately after ejection (ng) | 9 | 9 | 9 | 9 | 27 | 9 |
| | Total weight of droplets after coalescence (ng) | 27 | 27 | 27 | — | — | — |
| Conditions for ejecting color ink droplet | Vm of ink droplet (m/s) | 5.0 | 5.0 | 5.0 | 5.0 | 5.0 | 5.0 |
| | Weight of ink droplet (ng) | 9 | 9 | 9 | 9 | 9 | 9 |
| Print quality | Amount of white ink mist deposited around head | A | A | A | C | C | C |
| | White ink bleeding | B | C | C | B⁻ | C | B⁻ |
| | Blurring of color image portion | S | C | C | A | B | C |

The results show that Examples 1 to 10, which employed an ink jet recording method that complies with the requirements set forth in the present disclosure, had a reduced mist of the white ink composition.

Examples 1 and 2 show that coalesce of three ink droplets results in higher ability to absorb satellite droplets and a thinner mist of the white ink composition than coalesce of two ink droplets. A coalescent ink droplet in Example 1, which is heavier than a coalescent ink droplet in Example 2, has higher kinetic energy when landing on the textile, promotes a reaction with the pretreatment agent, and causes less blurring of a white image.

In Example 3, the ink droplets have a smaller weight, and an increased number of ink droplets must be ejected. Thus, Example 3 had a thicker mist of the white ink composition than Example 1. The increased number of ejected ink droplets results in a longer printing time and consequently improved blurring of the white image.

In Example 4 with the head 2 configuration, white printing and color printing were performed almost continuously with the two heads on the same carriage. This resulted in a short printing time. The short printing time tended to result in blurring of the color image portion.

Examples 1, 5, and 6 show that among the coagulants in the pretreatment agents the polyvalent metal salt is superior to the cationic polymer and the cationic surfactant.

Examples 1 and 7 to 9 show that among the white pigments the titanium oxide has a higher specific gravity than the hollow resin particles, and therefore ink droplets containing the titanium oxide have higher kinetic energy when landing on the textile, promote a reaction with the pretreatment agent, and cause less blurring of the white image. A white ink composition containing a reactive resin can form a film in the image recorded area and reduce blurring of the white image and blurring of the color image portion.

Examples 1 and 10 show that the pretreatment of the textile can improve the fixability of the white ink composition and the color ink composition on the textile and reduce blurring of the white image and blurring of the color image portion.

In Comparative Examples 1 and 3, three ink droplets were ejected from the same nozzle and landed on the textile without coalescence. In these examples, satellite droplets of each ink droplet could not be absorbed and caused a thick mist of the white ink composition. In Comparative Example 3 with the head 2 configuration, white printing and color printing were performed almost continuously with the two heads on the same carriage, thus taking a short printing time. This tended to result in blurring of the color image portion.

In Comparative Example 2, instead of ejecting a plurality of ink droplets from the same nozzle, a heavy ink droplet was ejected from a nozzle onto the textile. In this example, satellite droplets of the ink droplet could not be absorbed and caused a thick mist of the white ink composition. Furthermore, the ink droplet with low fluidity had low reactivity with the pretreatment agent when landed on the textile and tended to cause blurring of the white image and blurring of the color image portion.

The present disclosure is not limited to these embodiments, and various modifications may be made therein. For example, the present disclosure includes substantially the same constitutions as those described in the embodiments, for example, constitutions with the same functions, methods, and results, or constitutions with the same objects and advantages. The present disclosure also includes constitutions in which unessential portions of the constitutions described in the embodiments are substituted. The present disclosure also includes other constitutions that have the operational advantages of the constitutions described in the embodiments and other constitutions with which the same objects can be achieved. The present disclosure also includes constitutions in which the constitutions described in the embodiments are combined with known techniques.

What is claimed is:

1. An ink jet recording method for recording on a textile comprising ejecting a white ink composition for ink jet textile printing containing a white pigment and water with an ink jet recording apparatus, wherein
    the white ink composition is ejected as 9 ng or less of droplets from a nozzle, and
    the droplets are ejected and recorded on the textile such that a droplet ejected later has a higher flight speed than a droplet ejected earlier and the droplets coalesce before landing on the textile.

2. The ink jet recording method according to claim 1, wherein
    the textile is treated with a pretreatment agent containing at least one coagulant selected from polyvalent metal salts, cationic polymers, and cationic surfactants.

3. The ink jet recording method according to claim 2, wherein
    the white ink composition contains 8% or more by mass of a component that reacts with the pretreatment agent.

4. The ink jet recording method according to claim 3, wherein
    the component that reacts with the pretreatment agent is composed of resin particles.

5. The ink jet recording method according to claim 1, wherein the ink jet recording apparatus includes
    a nozzle array configured to eject the white ink composition located upstream in a sub-scanning direction, and
    a nozzle array configured to eject a non-white ink composition for ink jet textile printing containing a non-white pigment and water located downstream in the sub-scanning direction.

6. The ink jet recording method according to claim 1, wherein
    the white ink composition has a density of 1.12 $g/cm^3$ or more.

7. The ink jet recording method according to claim 1, wherein
    the white pigment is composed of titanium oxide particles.

* * * * *